J. COHN.
BELT REPLACING DEVICE.
APPLICATION FILED NOV. 11, 1918.

1,318,727.
Patented Oct. 14, 1919.

INVENTOR
Jacob Cohn.
By Day, Oberlin & Day
ATTORNEYS.

UNITED STATES PATENT OFFICE.

JACOB COHN, OF CLEVELAND, OHIO.

BELT-REPLACING DEVICE.

1,318,727.  Specification of Letters Patent.  Patented Oct. 14, 1919.

Application filed November 11, 1918. Serial No. 261,996.

*To all whom it may concern:*

Be it known that I, JACOB COHN, a citizen of the United States, and a resident of Cleveland, county of Cuyahoga, and State of Ohio, have invented a new and useful Improvement in Belt-Replacing Devices, of which the following is a specification, the principle of the invention being herein explained, and the best mode in which I have contemplated applying that principle so as to distinguish it from other inventions.

The present invention relates to a device for replacing belts upon pulleys. It is used more particularly for replacing the round belts such as are used to drive power sewing machines and the like. The device is simple and easy to operate and saves time over the old method of replacing by hand. It also eliminates the danger of having the operator handle the belts and allows the operator to stand away from the machine far enough to prevent the clothing from catching in any of the moving parts. To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:—

Figure 1:
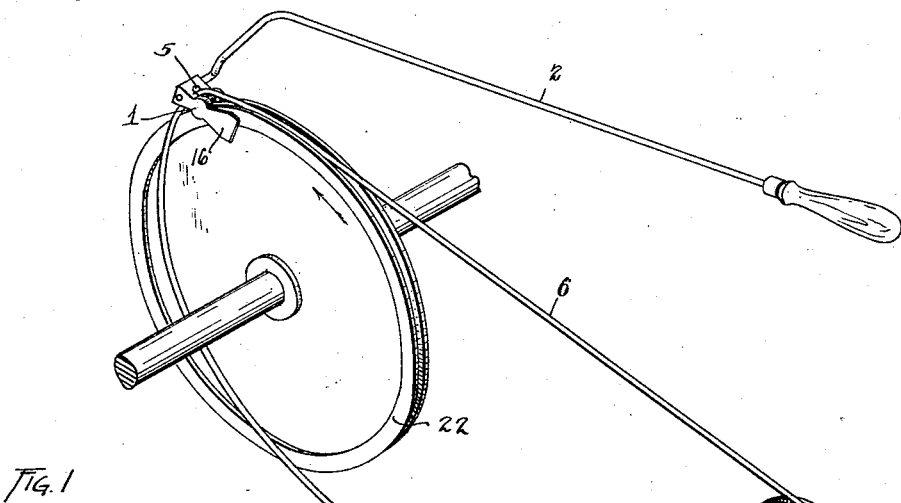
Figure 2:
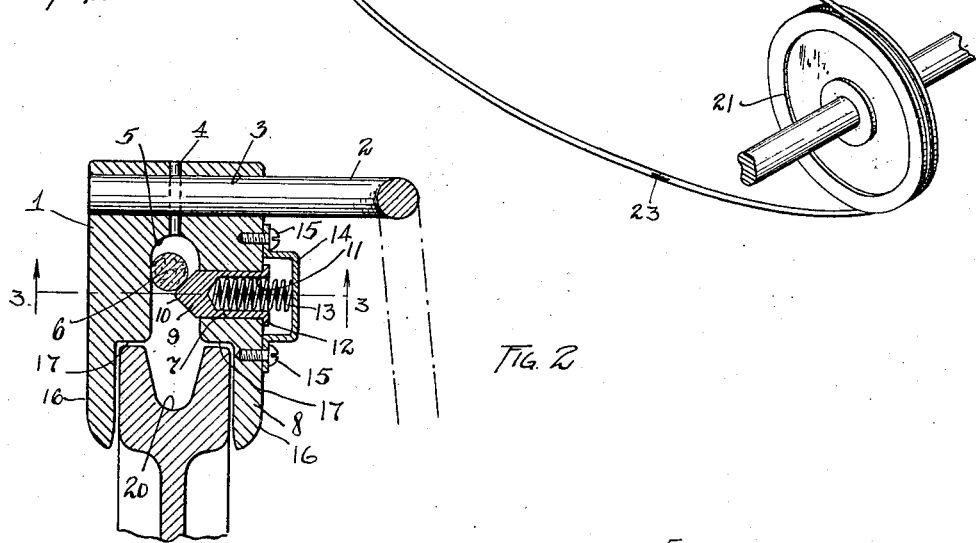
Figure 3:
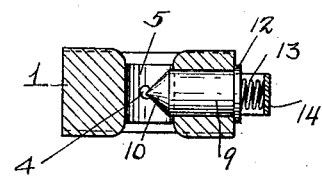
Figure 4:
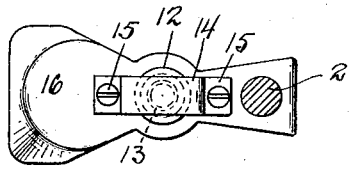

Figure 1 is a perspective view showing my improved device in position to replace a belt; Fig. 2 is a section through the device and the rim of the pulley wheel showing the device engaging the belt; Fig. 3 is a section on the line 3—3, Fig. 2; and Fig. 4 is a side elevation of the device.

The device consists of a U-shaped member 1 having a handle 2 extending through an aperture 3 in the top of the member, the handle being held in place by a pin 4.

There is a slot 5 in the member, the slot being slightly wider than the belt 6 and being adapted to receive the same. Through an aperture 7 in one of the extending arms 8 of the member, a pin 9 is movably mounted. This pin has a rounded or cone-shaped end 10 which extends into the slot between the two arms and is adapted to retain the belt in the upper portion of the slot. As best shown in Fig. 3, the pin is hollowed out as at 11 and is provided with a flange 12 which contacts the outer side of the arm to limit the inward movement of the pin. A spring 13 is mounted in the hollowed out portion of the pin and the spring engages the under side of a clip 14 carried by the device and held in place by screws 15.

Below the slot 5, the arms are flattened as at 16 and the slot is increased in width forming shoulders 17 which are adapted to ride the upper edges of the pulley wheel rim, the flattened portions or fingers 16 fitting loosely over the sides of the rim and holding the device securely upon the pulley wheel with the slot 5 alined with the belt slot 20 in the wheel.

The corners and edges of the applicant's device are rounded off both at the shoulders 17 and the inner edges of the arms and the fingers so as to prevent the belt from catching or breaking and pulling the device from the operator's hand. The handle extends outwardly from the member and then turns upwardly and outwardly away from the member, the rest of the handle extending at an angle to the center line of the device so that the operator can stand away from the pulley. The drop or upward bend in the handle allows the device to be passed over and well around the pulley wheel to replace the belt.

In operating the device to replace a belt, the belt is first placed upon the driven pulley 21 by hand and then forced past the pin into the upper portion of the slot 5. The operator then moves the device toward the driving pulley 22 and engages the fingers on the rim of the pulley until the device is in the position shown in Fig. 1. The device is then moved around the pulley in the direction shown by the arrow until the tension of the belt is sufficient to force the pin outwardly and allow the belt to snap into place in the groove in the pulley wheel. The upward bend in the handle allows the device to be moved around the wheel without the handle contacting the pulley shaft. If the pulley wheel 22 runs in a direction opposite to the arrow, the belt will be engaged by the device on the under side and moved around the wheel in the opposite direction. It will be seen that as soon as the tension on the belt is greater than that of the spring which holds the pin in the slot, the pin will be forced outwardly and the belt will snap into the groove due to its tension.

The extending fingers which engage the rim of the pulley wheel make it a very simple matter for the operator to move the device around the wheel and keep the slot in the device in alinement with the groove in the rim of the wheel, so that the belt seats itself automatically as soon as it is released from the device.

As all the edges are rounded, there is no danger of the clip 23, which holds the two ends of the belt together, from catching on the device and either breaking the belt or jerking the device from the operator's hand. This eliminates the danger heretofore encountered of having this clip open, so that it will catch and tear or cut the operator's hand when the belt is replaced. The device is simple and easy to manufacture and can readily be used by anyone without careful training and without endangering the operator in any way.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. A belt replacing device comprising a member having a slot, belt retaining means mounted in said member and extending into such slot, and fingers on said member and forming shoulders therewith, said fingers extending below such slot and adapted to hold the device in position on a pulley wheel to aline such slot in said member with the groove in the pulley wheel.

2. A belt replacing device comprising a member having extending arms between which the belt is held, means mounted in one of said arms for retaining the belt between said arms, fingers extending from said arms and forming shoulders therewith, said fingers being adapted to fit over the pulley wheel to aline the belt opening between the arms with the grooves in the pulley wheel, and a handle attached to said member.

3. A belt replacing device comprising a member having extending arms between which the belt is held, a pin resiliently mounted in one of said arms and extending toward the other to retain the belt above said pin, fingers extending from said arms and forming shoulders therewith, said fingers being adapted to extend over the pulley wheel to maintain the device in position thereon, and a handle attached to said member and extending upwardly and at an angle to the center line of said member.

4. In a device for replacing belts on pulley wheels, the combination of a member having two extending arms with a belt receiving slot therebetween, a pin having a rounded end mounted in one of said arms and partially closing such slot, resilient means for holding said pin in such closing position, fingers extending from said arms and leaving shoulders adapted to ride upon the pulley wheel, said fingers being adapted to extend over the sides of the pulley wheel rim to aline such slot with the groove in the pulley wheel, and a handle attached to such member and extending upwardly and then outwardly therefrom at an angle to the center line of the member.

Signed by me, this 8th day of November, 1918.

JACOB COHN.

Copies of this patent may be obtained for five cents each, by addressing the "Commissioner of Patents, Washington, D. C."